United States Patent [19]

Cajigas

[11] Patent Number: 5,145,697
[45] Date of Patent: Sep. 8, 1992

[54] INSTANT YOGURT COMPOSITION AND PROCESS

[75] Inventor: Stanley Cajigas, Toms River, N.J.

[73] Assignee: MPY Foods, Inc., Pine Brook, N.J.

[21] Appl. No.: 742,023

[22] Filed: Aug. 8, 1991

Related U.S. Application Data

[63] Continuation-in-part of Ser. No. 721,716, Jun. 26, 1991, which is a continuation of Ser. No. 571,115, Aug. 22, 1990, abandoned, which is a continuation-in-part of Ser. No. 344,361, Apr. 26, 1989, Pat. No. 4,956,185.

[51] Int. Cl.$^5$ ................................................. A23K 1/08
[52] U.S. Cl. ........................................ 426/43; 426/41; 426/573; 426/583; 426/657; 426/548; 426/658
[58] Field of Search .................... 426/573, 583, 41, 42, 426/43, 61, 658, 548, 657

[56] References Cited

U.S. PATENT DOCUMENTS

| | | | |
|---|---|---|---|
| 4,066,794 | 1/1978 | Schur | 426/43 |
| 4,110,476 | 8/1978 | Rhodes | 426/43 |
| 4,289,788 | 9/1981 | Cajigas | 426/43 |
| 4,289,789 | 9/1981 | Cajigas | 426/43 |

*Primary Examiner*—R. B. Penland
*Attorney, Agent, or Firm*—Hopgood, Calimafde, Kalil, Blaustein & Judlowe

[57] ABSTRACT

This invention provides an instant, dry powdered yogurt formulation which can be reconstituted into either a yogurt meal or a yogurt drink, and a process for making same. The formulation of this invention includes hydrocolloid gums, preferably a combination of xanthan gum and locust bean gum, and may include other gel systems such as a combination of carrageenan and diary protein, active protein, or certain type of maltodextrins. The powder can be reconstituted into a yogurt product of the desired thickness virtually instantaneously with agitation using a household blender, agitating by hand requires slightly longer times, but still under a minute. The composition is also useful for making a frozen or chilled yogurt product.

16 Claims, No Drawings

INSTANT YOGURT COMPOSITION AND PROCESS

This application is a continuation-in-part of Ser. No. 721,716, filed Jun. 26, 1991, which is a continuation of Ser. No. 571,115 filed Aug. 22, 1990, now abandoned, which is a continuation-in-part of Ser. No. 344,361 filed on Apr. 26, 1989, now U.S. Pat. No. 4,956,185: the disclosures of which are all incorporated herein by reference.

BACKGROUND OF THE INVENTION

This invention relates to a food product, and more particularly to a dry yogurt product, and a process for preparing same. The dry product of this invention may be reconstituted to form either a liquid or a semi-solid food by the addition of a liquid such as milk.

Yogurt is a form of fermented milk which has been curdled to a smooth, creamy, or custard-like consistency. Natural yogurt is produced by the fermentation of acid-producing organisms, typically bacilli, such as *Lactobacillus bulgaricus*, *Lactobacillus acidophilus*, and *Streptococcus thermophilus*, as well as newly used *bifidobacterium*; dairy products may also include added protein, such as bovine lactoferrin. Generally, one or more such microorganisms are added to milk and then incubated until the desired amount of fermentation has occurred. The fermentation process lowers the pH of the milk and causes it to curdle. The product thus produced is ordinarily chilled to stop the intended microbial action and to inhibit undesirable microbial action, thereby preserving the product in the desired condition. It is in this form, chilled and hydrated, that yogurt is commonly sold.

A process for preparing a liquid yogurt which may be frozen is disclosed in U.S. Pat. No. 4,110,476. However, it is convenient to have an instant yogurt which may be preserved for long periods of time, and which may be reconstituted easily by the average consumer. U.S. Pat. No. 1,269,769 refers to instant yogurt drink formulations that are reconstituted with milk. Similarly, U.S. Pat. No. 4,289,788 refers to instant yogurt meal (i.e. semisolid) compositions that are reconstituted with milk. U.S. Pat. No. 4,624,853 discloses another type of instant yogurt-like product.

The texture of a yogurt is an important factor effecting its acceptability to consumers. Yogurt should be free of lumps or curds, and should exhibit a smooth, custard-like consistency. A high quality yogurt has a good texture, is low in fat, includes effective amounts of active culture, and provides a high nutritional value by way of protein, calcium, and other useful nutrients.

High quality hydrated yogurt products are sold commercially. It is also possible for consumers to produce high quality yogurt at home, although this requires a fair amount of time, effort, and skill. However, all hydrated yogurt products have a quite limited shelf life, even while refrigerated. Therefore, yogurt must be consumed soon after production to avoid spoilage, including transport of the product, even while continuously refrigerated.

An instant yogurt product would provide the benefits of both long shelf life and convenient preparation and storage. It has not been possible to produce an instant high quality yogurt product which can be conveniently reconstituted into either a yogurt drink or a yogurt meal.

SUMMARY OF THE INVENTION

In one aspect, the present invention provides an instant powdered composition. This composition comprises a mixture of essential ingredients, including active yogurt culture(s) and yogurt powder, a mixture of xanthan and locust bean gums to provide gelling, and at least one other gel system. The composition may optionally include deactivated yogurt powder, fiber (such as bran or purified cellulose), and a dispersant. The inventive composition can also include sweeteners (artificial or natural), flavoring agents, and coloring agents. Most preferably, the composition includes a proteinaceous dairy product.

In another aspect, the present invention provides a process for preparing the above identified instant powdered composition. This process comprises mixing the above identified ingredients to form a free flowing, dry, powdered composition.

An object of this invention is to provide a packaged instant yogurt preparation that requires no refrigeration, has a prolonged shelf life, and can be reconstituted as either a yogurt drink or a yogurt meal.

Another object of the present invention is to provide a process for preparing an instant yogurt preparation that can be reconstituted to form either a yogurt drink or a yogurt meal. That is, a yogurt preparation that, when reconstituted, will gel and thicken within one minute when agitated by hand and virtually instantaneously when agitated mechanically (such as with a household blender).

A further object of the present invention is to provide an instant yogurt formulation having high quality, including good visual texture and mouthfeel, and a high nutritional value.

Thus, the invention provides in specific embodiments a powdered yogurt formulation comprising an amount of yogurt culture effective to provide a desired yogurt flavor, dehydrated yogurt solids, a mixture of highly purified locust bean gum and xanthan gum in essentially equal weight fractions, and, at least one gel system selected from effective amounts of i) a mixture of carrageenan and a calcium containing dairy product, ii) at least 6 wt. % of an active protein, and iii) a mixture of maltodextrin having a low dextrose equivalent and an active protein. In more specific embodiments, the yogurt culture is present in amounts of from about 0.001% to about 2% by weight, the dehydrated yogurt powder is present in amounts of up to 45 wt. %, the mixture of xanthan and locust bean gums is present in an amount of from about 0.1% to about 20% by weight, the low dextrose equivalent maltodextrin is present in amounts of from about 10% to about 40% by weight, the culture includes at least one of *L. bulcaricus*, *L. acidoohilus*, and *S. thermophilus*, the carrageenan is present in amounts of from 0.5% to 5% by weight, and the composition further includes up to 25% by weight of rice maltodextrin. In one formulation the composition comprises 5-5wt. % in total of essentially equal quantities of locust bean gum, xanthan gum, and carrageenan, 10-30 wt. % low dextrose equivalent maltodextrin, 6-12% active protein, and 10-20 wt. % rice maltodextrin. In another specific formulation the composition comprises 3-10 wt. % in total of essentially equal quantities of locust bean gum and xanthan gum, 10-30 wt. % low dextrose equivalent maltodextrin, 10-30 wt. % rice maltodextrin, and 3-10 wt. % active protein.

Other objects and advantages of the present invention will become apparent from the following description of the preferred embodiments of the present invention.

DETAILED DESCRIPTION OF THE PREFERRED EMBODIMENTS

The present invention comprises an instant powdered composition that will form a yogurt meal or a liquid yogurt drink when mixed with liquid, and a process for preparing said composition. The preferred liquid for mixing is liquid or reconstituted milk. The composition is also useful for forming a frozen dessert product. Commercial sources for the various components can be found in the 1991 version of *Prepared Foods: Food Industry SourceBook* (Chicago: Gorman Publishing Company, 1990).

The dry powdered composition of this invention is suitably mixed with milk in the approximate proportion of 15 to 40 grams of powder to ⅔ cup (5-6 ounces) of milk to form a yogurt product. The optimal proportions needed to create a drink or a meal, that is, a more liquid-like or a more solid-like product, will vary depending upon the particular embodiment, and the preference of the consumer.

This invention is not limited to use with any particular type of milk; any milk or milk substitute may be used, such as whole milk, skim or non-fat milk, non-dairy creamers, powdered milk, and the like. Of course, powdered milk must be reconstituted with an appropriate amount of water, either before or after mixing with the instant yogurt powder, to form the requisite quantity of milk; likewise, powdered milk may reconstituted with more or less water to vary the attributes of the final yogurt product. The fat content of the milk may vary from 0% (skim milk) up to roughly 4% (whole milk), or even higher (cream or "half and half" could be used if desired) The fat content of the reconstituted yogurt product will, of course, depend upon the fat content of the milk used to create it. If non-fat milk is used, a non-fat yogurt is produced (if there are no other fat sources in the composition).

Yogurt flavor is imparted to the composition of the present invention by active yogurt culture and, optionally, deactivated yogurt powder. Yogurt powder is dehydrated and may be of the type typically produced and sold by large suppliers of yogurt powder or it may be yogurt powder manufactured directly for use in production according to standard evaporation and drying techniques. While yogurt powder is made from natural yogurt containing an active culture, the processing of natural yogurt with heat to remove all moisture acts to destroy the yogurt culture. Recent processing advances have allowed for the manufacture of powdered yogurt without deactivating the culture. The yogurt powder may be dried by freeze drying, spray drying, roller drying, or any other commercial drying technique. The preferred yogurt powder is spray dried. The amount of dehydrated yogurt in the invention composition may be up to about 45% by weight or more, but generally is from about 10% to about 45% by weight. Preferably, the amount of yogurt powder is from about 20% to about 30% of the total dry powdered composition. Most preferably, the yogurt powder comprises from about 35% to about 39% of the composition.

Dry active culture or dehydrated yogurt powder with active culture added after processing are also commercially available. Dried active culture is used as a culture for the production of natural yogurt. For purposes of inclusion in a dried composition in accordance with the invention, it is preferable to use a dry culture in which the bacilli are in the dormant state and are activated when water (or milk) is added to the preparation; this culture must be sufficiently stable for storage at room temperature. Stabilized, dried cultures of lactic acid-producing bacteria of the type described in U.S. Pat. No. 3,837,397 (the disclosure of which is hereby incorporated by reference) may be used for the present invention. The cultures commonly used in yogurt serve, when ingested, to promote the growth of intestinal bacteria which are beneficial to the intestinal flora of the small intestine and which help promote food digestion and absorption across the small intestine.

The amount of culture used in the present composition may vary widely, although it is generally from about 0.001% to about 2.0%. Typically, the lower portion of this range of concentrations is used, preferably from about 0.001% to about 0.01%. The culture may be a single bacterium type or a mixture of two or more such species; preferred are those previously mentioned, such as *Lactobacillus buloaricus, Lactobacillus acidophilus,* and *Streotococcus thermophilus*. When no deactivated yogurt powder is used, a greater percentage of culture may be used to supply a stronger yogurt flavor, e.g., from about 0.01% to about 2%; preferably, powdered milk also will be included in the mixture when yogurt powder is absent. Powdered cultured milk may be used with, or instead of, ordinary powdered milk. Powdered milk, cultured or uncultured, may be used even where powdered yogurt is present in the mixture to provide unique flavor, texture, or nutritional characteristics.

The composition of the present invention may comprise whey. Whey is an excellent source of high value protein. The whey used in the present invention may be a sweet whey, an acid whey, or a delactose whey depending on the flavor and nutritional characteristics desired in the final product. Delactose whey has less lactose and a higher concentration of protein. A sweet whey is generally used to make a non-fruit flavored yogurt. An acid whey (i.e., a whey-containing lactic acid) is generally used to make a fruit-flavored yogurt product, to produce a more sour taste. Acid wheys may affect the gel setting characteristics of the yogurt product, so higher concentrations of a gel system are generally used with an acid whey to counter this effect. The dry yogurt composition of the present invention generally comprises approximately 10-30% by weight of a whey, and preferably comprises about 10-20% whey. However, whey could be omitted entirely in favor of other proteinaceous dairy products such as powdered milk, or powdered cultured milk, which would result in a richer product. Non-dairy proteinaceous components, such as soy protein, albumin, or beef caseinates may be added to increase the nutritional value of the composition.

For fruit-flavored compositions, a particularly preferred whey is a mixture of acid whey and citric acid. This mixture is particularly preferred because it combines the advantages of acid whey while controlling the total amount of acid in the mixture by varying the amount of citric acid. The amount of food acidulant that may be used in the dry composition of the present invention should be sufficient to adjust the pH of the solution formed when the composition is combined with water to about 3.5 to 4.5. If the pH is lower than about 3.5, the product may be coarse in texture due to an acid-induced protein reaction.

The present invention provides an instant yogurt composition by providing one or more, preferably at least two, gel systems which set rapidly and do not adversely effect the nutritional or textural (visual or mouthfeel) characteristics of the yogurt product. "Setting rapidly" generally means that adding the powder composition to liquid and shaking by hand yields a thickened product within 60 seconds, preferably within 30 seconds; it also means that agitating by machine, such as a household blender, results in essentially instantaneous gelling, in practical terms within 15 seconds.

One such gel system includes one or more hydrocolloid gums. The hydrocolloid gum is preferably a mixture of xanthan gum and locust bean gum. The locust bean gum is preferably refined or clarified, most preferably highly refined. Other suitable hydrocolloid gums include tragacanth gum, guar gum, and carrageenan. Carrageenan gum may also be used preferably in combination with the mixture of xanthan gum and locust bean gum.

The hydrocolloid gum types and quantities can be adjusted to produce either a yogurt drink or a yogurt meal (i.e., to vary the consistency of the product). One preferred gum system includes approximately equal weight fractions of xanthan gum and locust bean gum; alternatively, guar gum may replace the locust bean gum and/or tragacanth gum may replace the xanthan gum. By "approximately equal" is generally meant a weight ratio of about 4:6, more preferably 4.5:5.5. Other substitutions may be made provided that the gelling characteristics of the gum or gum mixture allows the powder composition to be reconstituted as either a drink or a meal, at the user's discretion. However, the mixture of xanthan and refined locust bean is most preferred because it has been found that such a system gels rapidly.

These gums preferably have a mesh size of about 20 to about 400 per cm., although a mesh size of about 100 to about 400 per cm. is more desirable for a smoother texture. The gums preferably have a mesh size of about two hundred to four hundred per cm., most preferably about three hundred, because these fine mesh gums produce a fine texture product. Lower mesh sizes, e.g. 20-50, may be used when a rougher texture is desired.

The total concentration of both gums when the gum mixture comprises xanthan gum and locust bean gum is from about 0.1% to about 20% by weight of the total composition. Preferably, the total concentration of these gums is from about 4% to about 11%. Most preferably, the total weight of gums in the instant formulation when this combination is used as the sole gel system is approximately 9 wt.%, with approximately half the weight being contributed by locust bean gum and half by xanthan gum. When the hydrocolloid gum mixture comprises xanthan, locust bean, and carrageenan the gums will be present in approximately equal weight proportions.

When the gum mixture of xanthan gum and locust bean gum includes carrageenan gum it has been found quite unexpectedly that the composition of the present invention is particularly adapted for use in ice cream type compositions or frozen desert compositions. When so constituted and used in an ice cream composition or a frozen desert composition the resulting product has improved milk properties and also improved mouthfeel.

The invention also contemplates other novel gel systems. As mentioned, carrageenan is a useful gum by itself or in combination with other gums. A preferred gel system includes both carrageenan and calcium ions in amounts effective to form a system that gels. In the presence of calcium ions, carrageenan will form a gel, and calcium ions are preferably provided by means of a dairy product. Accordingly, a milk product is advantageously used in combination with carrageenan to provide a gel system. The amounts of carrageenan and milk (calcium ions), both in relation to each other and their combined amount in the final product, effective to provide a desired gel system conventionally are determined empirically (experimentally) by the skilled artisan.

Another gel system, although optionally usable as a single component, is an active protein, such as concentrated milk protein, albumin, or whey concentrate. Concentrated milk protein (CMP) also contains calcium ions, and thus is advantageously used in combination with carrageenan to add strength to the gelled system. CMP preferably has 50% to 95% protein and is typically provided as an ultrafiltration product from milk. The active protein is preferably present in an amount of from 2% to 15% by weight, and most preferably present in amounts of at least 6% when used as a sole gelling agent.

Yet another gel system includes various complex carbohydrates, especially different types of maltodextrin. Maltodextrin with a low dextrose equivalent such as 10 D.E. has unexpectedly been found to promote gelation rather than weakening the gelled system; weakening of the gel would have be expected with a higher solids content, maltodextrin being a solid. A variation on this system is a combination of rice maltodextrin with regular maltodextrin and milk protein. For example, a system including a combination of xanthan, locust bean, and carrageenan gums, CMP, and rice maltodextrin was found to gel in an acidic system; this system without the carrageenan also gelled; when the CMP concentration was lowered to less than 6% the system did not gel; when the rice maltodextrin was next removed and the CMP concentration raised above 6% the system again gelled.

The "dextrose equivalent" (DE) for maltodextrin is a measure of the actual percentage of the maltodextrin that is composed of digestible dextrose. The other portion is composed of essentially undigestible complex carbohydrate. Accordingly, a lower DE means the maltodextrin is less sweet. However, the complex carbohydrate portion is used beneficially to provide a chewy texture to the product, and thus a maltodextrin having a lower DE can be used less as a sweetener and more to vary the texture of the product.

Maltodextrin or corn syrup solids having a low dextrose equivalent are used advantageously to provide an improved frozen or ice cream-type yogurt product. In addition to providing a chewier mouthfeel, and without limitation to any particular theory of operation, maltodextrin appears to plasticize the ice crystals formed when producing a frozen product. A frozen product generally requires a higher solids content than a merely cooled product. For example, at a lower solids content, the water can form an essentially continuous phase, with the resulting frozen product being as hard and unpalatable as a block of ice. With a higher solids content, the ice becomes a more discontinuous phase, and thus the product achieves some plasticity; however, the presence of large ice crystals diminishes the value of the product. Yet as also mentioned, a higher solids content leaves less water available for the gel system, which may lead to a lower gel strength. Unexpectedly, I have found that maltodextrin allows for a higher solids content without detrimentally effecting the gel strength and also appears to plasticize the frozen product. More specifically, I have used water contents as high as 90%, although 70-80% is more preferred, while producing a high quality texture. Also surprising is that the compositions useful for frozen products can be drawn down over a wide temperature range, from 18° to 29° F., a broad practical range of temperatures. Accordingly, a frozen product can be produced with very low solids contents, although generally 17-30% solids is preferred.

The combination of xanthan gum, locust bean gum, and carrageenan gives the yogurt ice cream a smooth, rich flavor and taste without a gritty texture due to ice crystals or a gummy texture due to the gums.

The fat content of a frozen product can also be reduced because of the plasticization effect of the maltodextrin. An essentially non-fat frozen product can be produced by replacing the fat with a substitute (e.g., Simplesse brand available from Nutro-Sweetcord.

The frozen compositions can be used in both gravity-fed and air-fed machines; this is surprising because all compositions are not necessarily amenable to processing in both types of machines. The overrun (percentage of air entrained into the final product) is typically from a low of 30% for a gravity-fed machine to a 50-60% for an air pumped Typical machines include those available from Taylor Company (Rockton, Ill.) and SaniServ (Indianapolis, Ind.). These compositions can also be used with household frozen product makers, that is, those based on "old fashioned" ice cream makers having a container set into ice water (or, more recently, a jacketed container having a fluid which can be repeatedly chilled in a freezer) and a dasher agitated by hand or a small motor. The mixing action of the dasher also promotes gellation and surprising does not appreciably degrade the gel system (i.e., a high quality product is produced). Ingredients having good solubility in cold water are preferred for frozen or chilled products.

Other ingredients may also be added to the composition of the present invention. For example a sweetener, either caloric or noncaloric, may be added. Typical caloric sweeteners include fructose, sucrose, and dextrose, although other sugars, such as corn syrup solids, lactose, etc., may be used. Various sweeteners may be employed singularly or in combination. Moreover, artificial sweeteners that are slightly caloric or noncaloric, such as, for example, edible saccharine salts, dipeptide units such as aspartame and the like, may be included in the dry mix to replace all or part of the sugar. Other artificial sweeteners, as they become approved for food use, may be used in the inventive composition. A preferred artificial sweetener is an aspartame mixture at a concentration of approximately 5%. This mixture comprises about one part aspartame and ten parts of a dispersant, e.g., whey powder. The amount of sweetener used may vary widely, but approximately 1-20% by weight of the yogurt formulation preferably is sweetener; more preferably 1-10% of the formulation is sweetener. Pure aspartame may be used in amounts of about 0.1% to about 1.5% of the yogurt formulation.

A fiber source in addition to the fiber provided by the gum which are present is often utilized in the inventive compositions. A preferred insoluble fiber source is bran, preferably rice bran, oat bran, or wheat bran. Soluble fiber also can be used. The increased solids content when adding fiber may adversely effect the gel strength such that manipulation of the gel system is required. Bran, or another suitable fiber source, or a combination of fiber sources, can comprise up to about 10% by weight of the composition. Suitably, bran is added to the composition, in a range of from about 0.3% to about 4.0% by weight. Preferably, rice bran constitutes approximately 1.0% of the total composition. Another fiber source suitable for use in the present invention is purified cellulose, including microcrystalline cellulose. The fiber content of the composition affects its texture, and thus may affect the mesh size chosen for the gums. If the fiber content is relatively low, a lower number mesh size will be needed to provide more texture to the product.

The nutritional aspects of the composition can be improved by the addition of a protein source. Suitably, this ingredient may comprise up to about 20% of the composition. Preferably, caseinate, such as sodium, potassium, or calcium caseinate, is added at about 10% to about 20% by weight of the total composition. Preferably, calcium caseinate constitutes approximately 15% of the composition. Whey protein concentrate can also be used as an added source of protein, either alone or in combination with other proteins.

An emulsifier or dispersing agent, e.g. lecithin, may be used in the inventive composition. Lecithin is the preferred emulsifier because it comprises a phospholipid complex which approximates the phospholipids naturally occurring in milk. Other emulsifiers, such as mono- and diglycerides and combinations thereof, citrate salts, or phosphate salts, may be used. The dispersing agent acts to disperse the powder particles in milk or water when the instant formulation is reconstituted. However, an emulsifier is less likely to be beneficial in processing if the composition is prepared by spray drying. The amount of dispensing agent used in the present invention is generally about 0.1 to 10%, although amounts outside this range may be used. Preferably about 0.3 to 1.5% by weight is used. Suitably about 0.5% is used.

Flavoring agents may be employed in the composition of the present invention. A flavoring agent may be natural or artificial or a combination thereof. Dehydrated fruits, such as apple-flavored bits, may also be employed. When a natural fruit flavoring agent is employed, the preferred sweetener is fructose because fructose brings out the natural fruit flavors to a greater extent than do other sweeteners. The amount of flavoring agent may vary widely, but generally an amount of from about 0.1% to about 5%, typically from about 0.3% to about 3.0%, and preferably from about 0.5% to about 1.0% by weight of the total composition may comprise flavoring agents.

The flavoring agents, and possibly the sweeteners, can effect the pH of the reconstituted product and thereby the gel system. For example, fruit flavors such as strawberry and orange typically present an acidic pH of below 6, vanilla provides an essentially neutral pH, and chocolate provides an alkaline pH of 8 or more. The pH can effect the gelling characteristics, such as interfering with the interaction between calciumions and carrageenan; likewise, acid can denature protein, and thus may adversely effect the proteinaceous gelling agents.

Coloring agents may also be used in the present invention. The coloring agent may be any acceptable coloring ingredient appropriate to the flavoring agents and approved for food use. For example, in the case of strawberry flavor, the appropriate coloring agent may be FD&C Red 40. The amount of coloring agent may vary widely, but an amount of generally from about 0.001% to about 1.0%, typically from about 0.02% to about 0.5%, and preferably from about 0.06% to about 0.1% by weight of the total composition may be used, depending upon the potency of the agent and the intensity of the color desired. Natural colors, e.g., beet color, may be used alone or in combination with other coloring agents.

The hydrocolloid gum of the present invention, such as the mixture of locust bean gum and xanthan gum, comprises a gelling system which thickens and produces a custard-like texture in the product. The inventive compositions are fully capable of setting to produce a yogurt meal of high quality, yet may also be employed to produce a high quality yogurt drink. Other gel systems are known in the art, e.g. those using instant starches, carrageenan, or other types of gums, but the prior art systems are not suitable substitutes for the gums in the present invention. Alginates may be used as a setting gel if calcium levels are carefully controlled, and gums such as agar may be used if specially treated, e.g. by pre-cooking and grinding. However, the gums of the present invention provide all the advantages disclosed herein without special calcium salts or phosphate salts to set the gel and without special treatment. When used in the proportions and mesh sizes stated above, these gums provide a system which gels in cold milk or water without special instantizing; these gums are cold water active.

The composition of the present invention may be prepared by dry blending the individual ingredients. Any temperature or pressure for the dry blending step may be employed, but essentially ambient temperatures and pressures are preferred.

The ingredients of the composition of the present invention may be admixed by any apparatus or means known to those skilled in the art, such as dry blending or spray drying. It is preferred that the ingredients of the composition of the present invention by admixed by spray drying using conventional food processing spray drying apparatus such as a Bowen spray dryer or a Nero dryer. Spray drying is preferred over, for example, dry blending because some of the ingredients of the composition are in the liquid state. To be dry blended, all ingredients must first be dried, whereas with spray drying, the blending and drying operations are performed in a single process step. Spray drying is thus more economical than dry blending for the present invention.

The process for preparing the composition of the present invention may be conducted in a continuous, semicontinuous or batch manner. The composition of the present invention is preferably packaged in a hermetically sealed envelope, such as a plastic foil laminated envelope which is heat sealed to exclude air and moisture. Once hermetically packaged, the preparation has an indefinite shelf life at ordinary room temperatures.

A consumer may use the instant yogurt compositions by breaking the package seal and pouring the powder into a container to which milk and/or water is added. A yogurt drink may be created, for example, by adding about 22 grams of powder to eight ounces of milk. The mixing can be achieved by using a motorized blender or shaking by hand. Once reconstituted, the refrigerated shelf life of the yogurt drink is approximately equivalent to that of refrigerated natural yogurt. A yogurt meal is typically prepared by mixing relatively more of the powder composition with liquid, and a yogurt drink by mixing relatively less.

As mentioned, the present formulation is for an "instant" yogurt product, by which is meant that at room temperature, upon reconstitution and typical agitation, the product will thicken to the consistency of stirred yogurt in a very short period of time, essentially instantaneously. The intent is for the final product to be essentially as thick as yogurt. It is appreciated that yogurt exhibits a time- and shear-rate dependent rheology from a technical view, but from a practical view a user of an instant product can readily determine whether the product appears to be substantially like yogurt in consistency. Many of the above-described gel systems will gel without agitation, but require extraordinarily long periods of time, about 24 hours under refrigeration. Such a product would be commercially unsuitable as an "instant" yogurt product. Rather, a product which sets in less than about five minutes, preferably less than about one minute, and more preferably in only 5–15 seconds, is considered to be an "instant" product. Gelation of the system is advantageously prompted by agitating the reconstituted composition, more desirably using mechanical agitation such as a household blender, although agitation by hand is sufficient. These novel compositions are useful especially in regions where refrigeration is unavailable, including both arid regions and emergency situations. The composition is formulated as a powder, water is added wherever the food product is prepared and consumed.

The present invention is further illustrated by the following examples. All parts and percentages in the examples as well as in the specification and the claims are expressed on a weight basis unless otherwise stated.

EXAMPLE I

To make a chocolate dessert yogurt drink, the following ingredients were dry blended at room temperature in a J. B. Day Dry Blender:

| Ingredients | % by Weight |
| --- | --- |
| Yogurt powder NFD | 35.88 |
| Sweet Whey | 18.42 |
| Lactobacillus culture | 0.0016 |
| Xanthan gum (mesh 200) | 3.19 |
| Locust bean gum (mesh 200) | 3.19 |
| Rice bran | 1.79 |
| Calcium caseinate | 13.95 |
| Purified cellulose | 3.99 |
| Cocoa | 11.96 |
| Chocolate flavor | 1.71 |
| Aspartame (1:10 mixture with whey powder) | 5.58 |
| Sodium aluminum silicate | 0.33 |

The above composition was reconstituted by taking approximately 15 to 30 grams of the dry powder and adding it to approximately 8 ounces of cold milk stirring in a blender; it was then ready for consumption. A natural tasting yogurt drink resulted.

EXAMPLE II

A strawberry yogurt formulation was created by mixing the following ingredients using a Bowen spray drying apparatus:

| Ingredients | % by Weight |
| --- | --- |
| Natural dry milk yogurt powder | 38.98 |
| Lactobacillus culture | 0.0013 |
| Sweet Whey | 18.34 |
| Xanthan gum (mesh 300) | 4.48 |
| Locust bean gum (mesh 300) | 4.48 |
| Calcium caseinate | 15.98 |
| Acid Whey | 4.98 |
| Lecithin | 1.00 |
| Purified cellulose | 1.00 |
| Strawberry W.O.N.F. | 2.95 |
| Rice bran fiber | 1.00 |
| Aspartame | 4.98 |
| (1 to 10 mixture with whey powder | |
| Citric acid | 1.33 |
| Sodium aluminum silicate | 0.40 |
| FD&C Red 40 | 0.10 |

The above composition was reconstituted by mixing approximately 15 to 30 grams of the composition with approximately 8 ounces of milk (preferably nonfat milk). The mixture was vigorously stirred in a blender and then was ready for consumption. A natural tasting yogurt drink resulted.

EXAMPLE III

A yogurt dessert formulation was created by mixing the following ingredients using a Bowen spray drying apparatus:

| Ingredients | % by Weight |
| --- | --- |
| Sweet Whey | 20.40 |
| Vanilla Flavor | 0.47 |
| Tricalcium Phosphate | 0.33 |
| NFDM | 8.79 |
| Yogurt powder | 22.43 |
| Xanthan Gum | 0.47 |
| Aspartame | 0.13 |
| Maltodextrin | 29.94 |
| Yogurt Culture | 0.006 |
| Maltol | 0.13 |
| Coffee Whitener | 14.51 |
| Mono- and diglycerides | 1.43 |
| Carrageenan | 0.71 |

The above composition was particularly adapted for use in making a yogurt ice cream product.

EXAMPLE IV

A strawberry yogurt desert formulation was operated by mixing the following ingredients using a Bowen spray drying apparatus:

| Ingredients | % by Weight |
| --- | --- |
| Sweet Whey | 29.03 |
| Strawberry W.O.N.F. | 6.49 |
| Silicon Dioxide | 0.76 |
| Locust Bean Gum | 3.48 |
| NFDM[1] Yogurt | 46.45 |
| NFDM Instant | 6.96 |
| Aspartame | 0.41 |
| Maltol | 0.19 |
| Carrageenan | 1.16 |
| Yogurt Culture | 0.004 |
| Xanthan Gum | 4.06 |
| Beet Powder | 0.49 |
| Citric Acid Powder | 0.46 |

1. NFDM is an abbreviation for "non-fat dried milk."
2. W.O.N.F. is an abbreviation for "with other natural flavors."

In the preparation of the foregoing composition the first three components, namely Sweet Whey, Strawberry W.O.N.F.[2], and silicon dioxide were first premixed and ground for five minutes and thereafter added to the balance of the remaining ingredients of the composition.

EXAMPLE V

Using the foregoing procedures, the following were made into a reconstitutable powder:

| Ingredients | % by weight |
| --- | --- |
| Maltodextrin 10 D.E. | 34.1 |
| Strawberry Flavor W.O.N.F. | 5.7 |
| Xanthan Gum | 2.9 |
| Silicon Dioxide | 0.5 |
| Locust Bean gum | 2.6 |
| Yogurt Cultured Whey Solids | 30.6 |
| Aspartame | 0.3 |
| Carrageenan | 2.6 |
| Concentrated Milk Protein 95% | 15.3 |
| Citric Acid | 2.0 |
| Mono- and diglycerides | 2.4 |
| Lecithin | 1.0 |

About 22.5 g. to about 35.5 g was used with about ⅔ cup of skim milk, low fat milk, or whole milk, depending upon the desired thickness (more powder for a yogurt meal, less powder for a yogurt drink) and fat content. Shaking well by hand for thirty seconds and blending for 10–15 seconds by electric mixer each provided an instantly reconstituted yogurt product.

EXAMPLE VI

Using the foregoing procedures, the following were made into a reconstitutable powder:

| Ingredients | % by weight |
| --- | --- |
| Maltodextrin 10 D.E. | 20.5 |
| Strawberry Flavor W.O.N.F. | 5.7 |
| Xanthan Gum | 2.9 |
| Silicon Dioxide | 0.5 |
| Locust Bean gum | 2.6 |
| Yogurt, Cultured Whey Solids | 17.0 |
| Yogurt, Dehydrated with Culture | 20.4 |
| Aspartame | 0.3 |
| Maltodextrin, from Rice | 17.9 |
| Concentrated Milk Protein 95% | 6.8 |
| Citric Acid | 2.0 |
| Mono- and diglycerides | 2.4 |
| Lecithin | 1.0 |

About 22.5 g. to about 35.5 g was used with about ⅔ cup of skim milk, low fat milk, or whole milk, depending upon the desired thickness (more powder for a yogurt meal, less powder for a yogurt drink) and fat content. Shaking well by hand for thirty second and mixing for 10–15 seconds by electric mixer each provided an instantly reconstituted yogurt product.

EXAMPLE VII

Using the foregoing procedures, the following were made into a reconstitutable powder:

| Ingredients | % by weight |
| --- | --- |
| Maltodextrin 10 D.E. | 20.5 |
| Strawberry Flavor W.O.N.F. | 5.7 |
| Xanthan Gum | 2.9 |
| Silicon Dioxide | 0.5 |
| Locust Bean gum | 2.6 |
| Yogurt, Cultured Whey Solids | 17.0 |
| Yogurt, Dehydrated with Culture | 20.4 |

| Ingredients | % by weight |
|---|---|
| Aspartame | 0.3 |
| Maltodextrin, from Rice | 15.3 |
| Concentrated Milk Protein 95% | 6.8 |
| Citric Acid | 2.0 |
| Mono- and diglycerides | 2.4 |
| Lecithin | 1.0 |

About 22.5 g. to about 35.5 g was used with about ⅔ cup of skim milk, low fat milk, or whole milk, depending upon the desired thickness (more powder for a yogurt meal, less powder for a yogurt drink) and fat content. Shaking well by hand for thirty second and mixing for 10–15 seconds by electric mixer each provided an instantly reconstituted yogurt product.

EXAMPLE VIII

Following the same general procedure, a dry composition prepared comprising:

| | | |
|---|---|---|
| Yogurt NFD | 175 g. | 15.7 wt. % |
| Strawberry Yogurt Composition (according to Example VI) | 350 g. | 31.3 wt. % |
| Coffee Whitener C.W.S. | 150 g. | 13.4 wt. % |
| Sweeteners (sucrose, fructose) | g. | wt. % |
| Maltodextrin | g. | wt. % |
| Corn Syrup Solids 42 DE | 225 g. | 20.1 wt. % |
| Mono- and diglycerides | 10 g. | 0.9 wt. % |
| Carrageenan | 7½ g. | 0.7 wt. % |

This composition, comprising 1117.5 g., was mixed with cold water to yield a total volume of 7.57 l. (2 gallons). The liquified composition was allowed to stand for five to ten minutes and then placed into an commercial ice cream machine, such as an air pump machine have a draw temperature of 18°–29° F.

Once a frozen product is made, it is handled in the same manner as a fresh yogurt ice cream mix.

EXAMPLE IX

The following composition was made according to the same general procedures:

| | | |
|---|---|---|
| Chocolate Yogurt Composition (from Example I) | 450 g. | 42.7 wt. % |
| Coffee Whitener C.W.S. | 125 g. | 11.9 wt. % |
| Yogurt Cultured Whey | 250 g. | 23.7 wt. % |
| Corn Syrup Solids 42 DE | 200 g. | 19.0 wt. % |
| Mono- and diglycerides | 20 g. | 1.9 wt. % |
| Carrageenan | 2¼ g. | 0.2 wt. % |
| Aspartame 1:10 | 5¼ g. | 0.5 wt. % |

As with the foregoing example, this dry composition was mixed with cold water to yield a total of two gallons, allowed to set for five to ten minutes, and then drawn through a commercial ice cream machine. The designation of aspartame of 1:10 means that one part (by weight) of aspartame is mixed with ten parts of a standard dilutent (e.g., maltodextrin or sugar) to facilitate accurate weighing of small quantities.

EXAMPLE X

Using the same general procedure the following composition was prepared:

| | | |
|---|---|---|
| Yogurt NFD | 150 g. | 14.3 wt. % |
| Vanilla Yogurt Composition (according to Example III) | 325 g. | 30.9 wt. % |
| Coffee Whitener C.W.S. | 150 g. | 14.3 wt. % |
| Yogurt Cultured Whey | 150 g. | 14.3 wt. % |
| Maltodextrin 18 DE | 250 g. | 23.8 wt. % |
| Mono- and diglycerides | 15 g. | 1.4 wt. % |
| Carrageenan | 7½ g. | 0.7 wt. % |
| Aspartame 1:10 | 3 g. | 0.3 wt. % |

As for the above frozen product examples, this composition is mixed with sufficient cold water to yield about two gallons, allowed to set for a short time, and drawn through a conventional commercial ice cream machine.

From the foregoing, it will be appreciated that, although specific embodiments of the invention have been described herein for purposes of illustration, various modifications may be made without deviation from the spirit and scope of the present invention.

What is claimed is:

1. A powdered yogurt formulation consisting essentially of
   an amount of bactobacillus yogurt culture effective to provide a desired yogurt flavor;
   up to 45 weight % of yogurt solids;
   from about 0.1% to about 20% by weight of a mixture of highly purified locust bean gum and xanthan gum in approximately equal weight fractions as a first gel system; and
   at least one additional gel system selected from:
   i) from about 0.5% to about 5% by weight of carrageenan and a calcium containing dairy product present in an amount of from about 1% to 20% by weight;
   ii) at least 6 wt. % of an active protein; and
   iii) from about 10% to about 40% by weight of maltodextrin having a low dextrose equivalent and less than 6 wt. % of an active protein.

2. The composition defined by claim 1, wherein the yogurt culture is present in an amount of from 0.001% to 2% by weight.

3. The composition defined by claim 1, wherein the culture includes at least one of *L. bulgaricus*, *L. acidophilus*, and *S. thermophilus*.

4. The composition defined by claim 1, wherein the calcium containing dairy product is concentrated milk protein.

5. The composition defined by claim 4, wherein the concentrated milk protein is present in an amount of from 1% to 20% by weight.

6. The composition defined by claim 1, which further consisting essentially of up to 25% by weight of rice maltodextrin.

7. The composition defined by claim 1, which further consisting essentially of a dispersant selected from the group consisting of monoglycerides, diglycerides, lecithin, and mixtures thereof.

8. The composition defined by claim 7, wherein the total amount of dispersant is from about 1% to about 5% by weight.

9. The composition defined by claim 1, which further consisting essentially of a flavorant or a sweetener.

10. The composition defined by claim 9, wherein the composition comprises an artificial sweetener.

11. The composition defined by claim 1, which further consisting essentially of a proteinaceous dairy product selected from the group consisting of whey, delactose whey, powdered milk, and powdered cultured milk.

12. The composition defined by claim 1, further consisting essentially of 5-15 wt. % in total of essentially equal quantities of locust bean gum, xanthan gum, and carrageenan, 10-30 wt. % low dextrose equivalent maltodextrin, 6-12% active protein, and 10-20 wt. % rice maltodextrin.

13. The composition defined by claim 1, further consisting essentially of 3-10 wt. % in total of essentially equal quantities of locust bean gum and xanthan gum, 10-30 wt. % low dextrose equivalent maltodextrin, 10-30 wt. % rice maltodextrin, and 3-10 wt. % active protein.

14. A process for preparing a powdered yogurt composition which can be reconstituted into either a yogurt meal or a liquid yogurt drink comprising mixing by spray drying or dry blending a formulation consisting essentially of: an amount of Lactobacillus yogurt culture effective to provide a desired yogurt flavor; up to 45% by weight of yogurt solids; from about 0.1% to about 20% by weight of a mixture of highly purified locust bean gum and xanthan gum in approximately equal weight fractions as a first gel system; and at least one additional gel system selected from:
  i) about 0.5% to about 5% by weight of carrageenan and a calcium containing dairy product present in an amount of from about 1% to about 20% by weight;
  ii) at least 6% by weight of an active protein and;
  iii) from about 10% to about 40% by weight of maltodextrin having a low dextrose equivalent and less than 6% by weight of an active protein.

15. A process for preparing an instant yogurt composition comprising mixing a powdered composition consisting essentially of: an amount of Lactobacillus yogurt culture effective to provide a desired yogurt flavor; up to 45% by weight of yogurt solids; from about 0.1% to about 20% by weight a mixture of highly purified locust bean gum and xanthan gum in approximately equal weight fractions as a first gel system; and at least one additional gel system selected from:
  i) about 0.5% to about 5% by weight of carrageenan and a calcium containing dairy product present in an amount of from about 1% to about 20% by weight;
  ii) at least 6% by weight of an active protein and;
  iii) from about 10% to about 40% by weight of maltodextrin having a low dextrose equivalent and less than 6% by weight of an active protein with an amount of liquid effective to produce a desired quality product and, agitating the resulting mixture.

16. The process defined by claim 15, which further comprises chilling the product effective to produce a frozen yogurt composition.

* * * * *